(12) United States Patent
Thebault et al.

(10) Patent No.: US 11,263,731 B2
(45) Date of Patent: Mar. 1, 2022

(54) METHOD AND DEVICE FOR COLOR GAMUT MAPPING

(71) Applicant: INTERDIGITAL VC HOLDINGS, INC., Wilmington, DE (US)

(72) Inventors: Cedric Thebault, Saint Aubin d'Aubigne (FR); Marie-Jean Colaitis, Cesson-Sevigne (FR); Angelo Mazzante, Cesson-Sevigne (FR)

(73) Assignee: INTERDIGITAL VC HOLDINGS, INC., Wilmington, DE (US)

( * ) Notice: Subject to any disclaimer, the term of this patent is extended or adjusted under 35 U.S.C. 154(b) by 130 days.

(21) Appl. No.: 16/608,860

(22) PCT Filed: Apr. 17, 2018

(86) PCT No.: PCT/EP2018/059758
§ 371 (c)(1),
(2) Date: Oct. 27, 2019

(87) PCT Pub. No.: WO2018/197263
PCT Pub. Date: Nov. 1, 2018

(65) Prior Publication Data
US 2020/0193573 A1 Jun. 18, 2020

(30) Foreign Application Priority Data
Apr. 27, 2017 (EP) .................... 17305471

(51) Int. Cl.
*G06T 5/00* (2006.01)
*H04N 9/64* (2006.01)
*H04N 9/68* (2006.01)

(52) U.S. Cl.
CPC ............. *G06T 5/009* (2013.01); *H04N 9/643* (2013.01); *H04N 9/68* (2013.01); *G06T 2207/20208* (2013.01)

(58) Field of Classification Search
CPC .......... G06T 5/009; G06T 2207/20208; H04N 9/643; H04N 9/68
(Continued)

(56) References Cited

U.S. PATENT DOCUMENTS 5,875,260 A 2/1999 Ohta
7,414,631 B2 8/2008 Tin
(Continued)

FOREIGN PATENT DOCUMENTS

CN 101132472 A 2/2008
CN 102110429 A 6/2011
(Continued)

OTHER PUBLICATIONS

Francois et al., "A Single-Layer HDR Video Coding Framework with SDR Compatibility"; IBC 2016 Conference, Amsterdam, Netherlands, Sep. 8, 2016, 10 pages.
(Continued)

*Primary Examiner* — Michael R Neff
(74) *Attorney, Agent, or Firm* — Invention Mine LLC

(57) ABSTRACT

The present principles relate to a method and device for gamut mapping from a first color gamut towards a second color gamut. The method comprises, in a plane of constant hue, obtaining a target lightness for a color on the boundary of first gamut with maximum chroma, called first cusp color; and lightness mapping of the color from the first color gamut towards the second color gamut wherein the lightness mapped color is calculated from a parabolic function applied to the color, the parabolic function mapping the first cusp color to a color having the target lightness. According to a particular characteristic, a preserved chroma is also obtained; and in case the chroma of the color is lower than or equal to the preserved chroma, the lightness mapped color is the color, and in case the chroma of the color is higher than
(Continued)

the preserved chroma, the lightness mapped color is calculated from the parabolic function applied to the color.

16 Claims, 8 Drawing Sheets

(58) Field of Classification Search
USPC .......................................................... 382/274
See application file for complete search history.

(56) References Cited

U.S. PATENT DOCUMENTS

| | | | |
|---|---|---|---|
| 7,663,641 | B2 | 2/2010 | Sloan |
| 7,751,081 | B2 | 7/2010 | Huang et al. |
| 8,665,290 | B2 | 3/2014 | Sloan |
| 2005/0248784 | A1 | 11/2005 | Henley et al. |
| 2007/0236761 | A1 | 10/2007 | Sloan |
| 2008/0080767 | A1 | 4/2008 | Cho et al. |
| 2017/0034521 | A1* | 2/2017 | Su ........................ H04N 19/182 |

FOREIGN PATENT DOCUMENTS

| | | |
|---|---|---|
| CN | 102289840 A | 12/2011 |
| CN | 104364820 A | 2/2015 |
| EP | 2375719 A1 | 10/2011 |
| EP | 3110129 A1 | 12/2016 |
| JP | 2005354227 A | 12/2005 |
| KR | 2008-0030339 A | 4/2008 |
| WO | WO 9728640 A1 | 8/1997 |

OTHER PUBLICATIONS

Anonymous, "High efficiency video coding", International Telecommunication Union, ITU-T Telecommunication Standardization Sector of ITU, Series H: Audiovisual and Multimedia Systems, Infrastructure of audiovisual services—Coding of moving video, Recommendation ITU-T H.265, Apr. 2015, pp. 1-634.

Anonymous, "High-Performance Single Layer Directly Standard Dynamic Range (SDR) Compatible High Dynamic Range (HDR) System for use in Consumer Electronics devices (SL-HDR1)", European Telecommunications Standards Institute, Technical Specification, ETSI TS 103 433 v1.1.1, Aug. 2016, pp. 1-84.

Diaz et al., "Integrating HEVC Video Compression with a High Dynamic Range Video Pipeline", SMPTE Motion Imaging Journal, vol. 125, No. 1, Jan. 2016, pp. 14-21.

Anonymous, "High Dynamic Range Electro-Optical Transfer Function of Mastering Reference Displays", Society of Motion Picture and Television Engineers, SMPTE ST 2084:2014, Aug. 16, 2014, pp. 1-14.

* cited by examiner

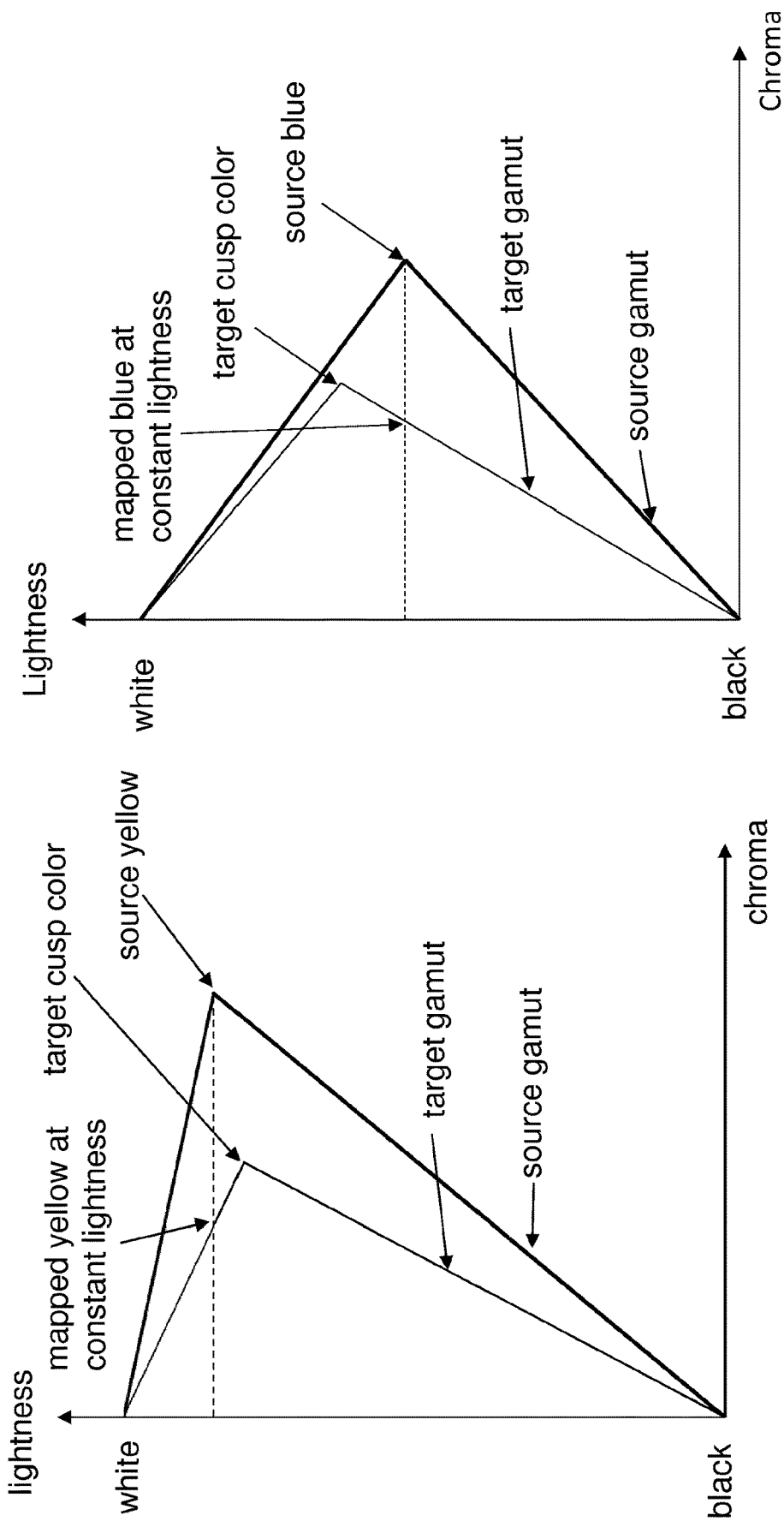
Fig. 1b : prior art
Fig. 1a : prior art

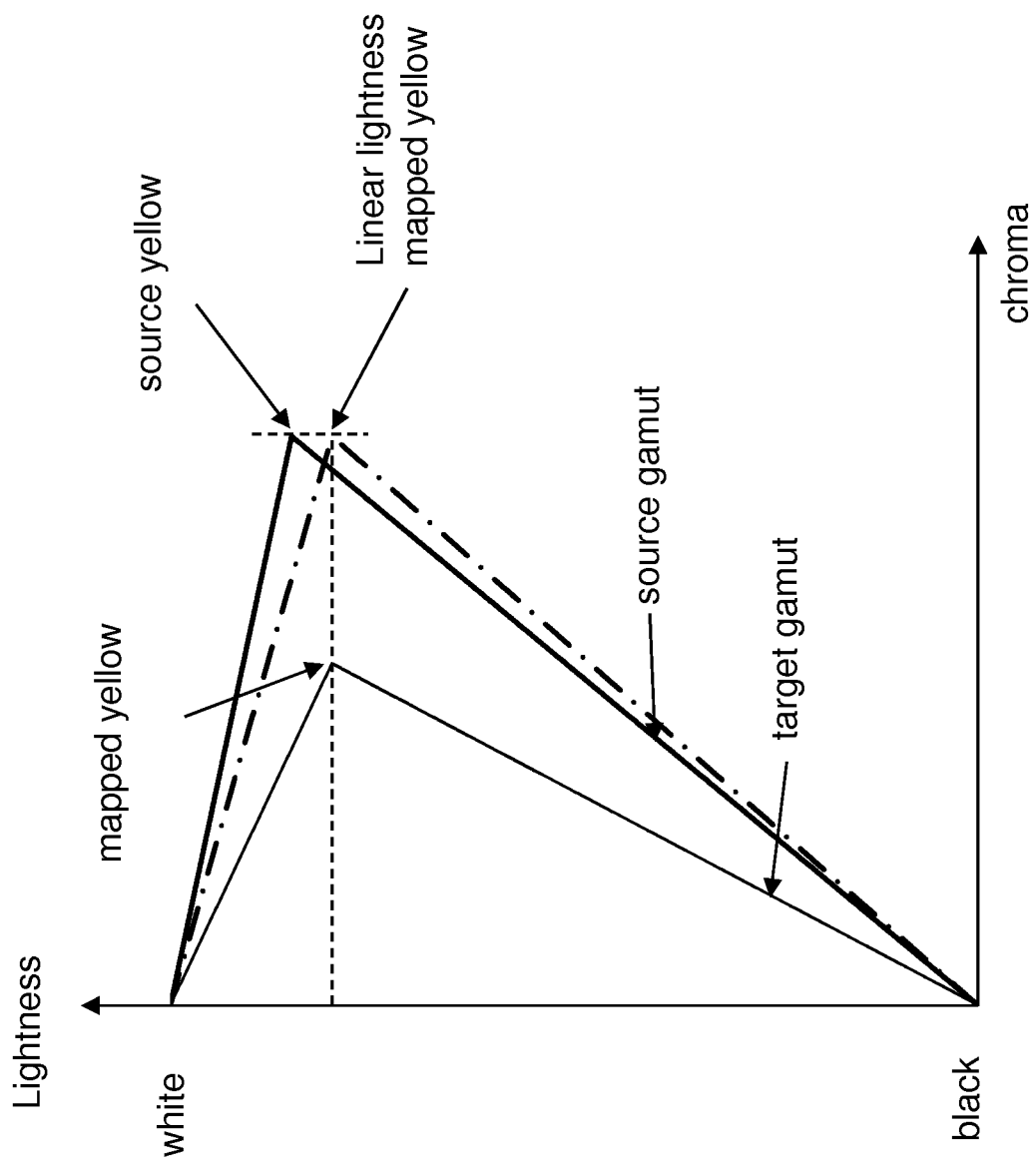
Fig. 1c : prior art

METHOD AND DEVICE FOR COLOR GAMUT MAPPING

This application claims the benefit, under 35 U.S.C. § 365 of International Application PCT/EP2018/059758, filed Apr. 17, 2018, which was published in accordance with PCT Article 21(2) on Nov. 1, 2018, in English, and which claims the benefit of European Patent Application No. 17305471.9, filed Apr. 27, 2017.

1. Field

The present principles generally relate to image/video coding/decoding. Particularly, but not exclusively, the technical field of the present principles are related to color gamut mapping of an image whose pixel values belong to a high-dynamic range and inverse color gamut mapping of an image whose pixel values belong to a low-dynamic range.

2. Background

The present section is intended to introduce the reader to various aspects of art, which may be related to various aspects of the present principles that are described and/or claimed below. This discussion is believed to be helpful in providing the reader with background information to facilitate a better understanding of the various aspects of the present principles. Accordingly, it should be understood that these statements are to be read in this light, and not as admissions of prior art.

In the following, an image contains one or several arrays of samples (pixel values) in a specific image/video format which specifies all information relative to the pixel values of an image (or a video) and all information which may be used by a display and/or any other device to visualize and/or decode an image (or video) for example. An image comprises at least one component, in the shape of a first array of samples, usually a luma (or luminance) component, and, possibly, at least one other component, in the shape of at least one other array of samples, usually a chroma component. Or, equivalently, the same information may also be represented by a set of arrays of color samples, such as the traditional tri-chromatic RGB representation.

A pixel value is represented by a vector of C values, where C is the number of components. Each value of a vector is represented with a number of bits which defines a maximal dynamic range of the pixel values.

Low-Dynamic-Range images (LDR images) are images whose luminance values are represented with a limited number of bits (most often 8 or 10). This limited representation does not allow correct rendering of small signal variations, in particular in dark and bright luminance ranges. In high-dynamic range images (HDR images), the signal representation is extended in order to maintain a high accuracy of the signal over its entire range. In HDR images, pixel values representing luminance levels are usually represented in floating-point format (either 32-bit or 16-bit for each component, namely float or half-float), the most popular format being openEXR half-float format (16-bit per RGB component, i.e. 48 bits per pixel) or in integers with a long representation, typically at least 16 bits.

The arrival of the High Efficiency Video Coding (HEVC) standard (*ITU-T H.265 Telecommunication standardization sector of ITU* (October 2014), *series H: audiovisual and multimedia systems, infrastructure of audiovisual services—coding of moving video, High efficiency video coding, Recommendation ITU-T H.265*) enables the deployment of new video services with enhanced viewing experience, such as Ultra HD broadcast services. In addition to an increased spatial resolution, Ultra HD can bring a wider color gamut (WCG) and a higher dynamic range (HDR) than the Standard dynamic range (SDR) HD-TV currently deployed. Different solutions for the representation and coding of HDR/WCG video have been proposed (SMPTE 2014, "High Dynamic Range Electro-Optical Transfer Function of Mastering Reference Displays, or SMPTE ST 2084, 2014, or Diaz, R., Blinstein, S. and Qu, S. "Integrating HEVC Video Compression with a High Dynamic Range Video Pipeline", SMPTE Motion Imaging Journal, Vol. 125, Issue 1. February, 2016, pp 14-21).

SDR backward compatibility with decoding and rendering devices is an important feature in some video distribution systems, such as broadcasting or multicasting systems.

Dual-layer coding is one solution to support this feature. However, due to its multi-layer design, this solution is not adapted to all distribution workflows.

An alternative is a single Layer HDR distribution solution as defined by the ETSI recommendation ETSI TS 103 433. The reader may also refer to the IBC 2016 article ("A single-Layer HDR video coding framework with SDR compatibility", E. François and L. Van de Kerkhof, IBC 2016) for more details. This single layer distribution solution is SDR compatible and leverages SDR distribution networks and services already in place. It enables both high quality HDR rendering on HDR-enabled CE (Consumer Electronics) devices, while also offering high quality SDR rendering on SDR CE devices.

This single layer distribution solution is based on a single layer coding/decoding process and is codec independent (a 10 bits codec is recommended).

This single layer distribution solution uses side metadata (of a few bytes per video frame or scene) that can be used in a post-processing stage to reconstruct the HDR signal from a decoded SDR signal.

When the decoded SDR signal and the reconstructed HDR signal do not have the same color space, an inverse gamut mapping (being the dual function of a gamut mapping in a pre-processing stage at the HDR encoding) may be used in such post-processing stage. In practice, color gamuts may be defined by standards such as NTSC, ITU-R BT rec.709 ("rec. 709"), ITU-R BT rec. 2020 ("rec. 2020"), Adobe RGB, DCI-P3, or any other present or future standards for color reproduction or any other constraint(s) on color variety. In case of single layer distribution of HDR/WCG, "color gamut mapping" is the process of mapping or redistributing colors of the wider color gamut ("source colors") colors of a narrower color gamut ("target colors"). When trying to define a method mapping source colors inside a source color gamut (having its own source boundary) into target colors such they are located inside a target color gamut (having its own target boundary), in order to take advantage of the whole range of colors in the target color gamut, it is known to define the color gamut mapping according to different conditions among which a boundary mapping condition: any source boundary color should be mapped into a target boundary color. However, such color gamut mapping is problematic because it results in faded colors as illustrated on FIG. 1a. FIG. 1a and FIG. 1b illustrate a color gamut mapping in a hue leaf in accordance with prior art. A hue leaf is a plane section of the color gamut at a constant hue (yellow on FIG. 1a, blue on FIG. 1b). The boundary color gamut mapping is performed by scaling chroma at a constant lightness value. FIG. 1a illustrates the case where the source cusp color (source yellow) is brighter than the target cusp color meaning that in this hue leaf the lightness of the source color with maximum chroma (source yellow) is greater (brighter) than the lightness of the target color (target cusp color) with maximum chroma. Those skilled in art will appreciate that if the source cusp color corresponds to the yellow primary of the source gamut, the target cusp color may not necessarily correspond to the yellow primary of the target gamut, as the yellow primary of the source gamut and the yellow primary of the target gamut may have different hues. As shown on FIG. 1a, without lightness mapping, the source yellow is mapped to a faded yellow (mapped yellow at constant lightness) being a mixture of yellow and white. Some colors on the source boundary with increasing value of chroma and lightness are thus mapped to color on the target boundary with decreasing value of chroma and increasing value of lightness. This is particularly visually embarrassing. Lightness mapping is desirable to avoid faded color. FIG. 1b illustrates the case where the source cusp color (source blue) is darker than the corresponding target cusp color meaning that in this hue leaf the lightness of the source color with maximum chroma (source blue) is smaller (darker) than the lightness of the target color (target cusp color) with maximum chroma. As shown on FIG. 1b, without lightness mapping, the source blue is mapped to a blue (mapped blue at constant lightness) of same brightness but desaturated. But unlike on FIG. 1a, colors on the source boundary with increasing values of chroma and lightness are still mapped to color on the target boundary with increasing values of chroma and increasing values of lightness.

FIG. 1c illustrates a color gamut mapping in a hue leaf, for instance the hue comprising the source yellow, in accordance with linear lightness mapping. US2005/248784 discloses a color gamut mapping method called shear mapping that maps in a hue leaf the source gamut boundary towards the target gamut boundary. This shear mapping corresponds to a linear lightness mapping. As shown on FIG. 1c, when using a linear lightness mapping, the previous yellow (source yellow) is mapped on a yellow of the target color gamut with maximum chroma (mapped yellow) thus avoiding the fading of colors. However linear lightness mapping may significantly modify the lightness of all colors in the hue leaf (except the colors on the grey axis). This alters the contrast of the image.

An invertible color gamut mapping method that avoid faded colors and better preserve the contrast of the image is therefore desirable for enhancing the rendering of HDR signal.

3. Summary

The following presents a simplified summary of the present principles in order to provide a basic understanding of some aspects of the present principles. This summary is not an extensive overview of the present principles. It is not intended to identify key or critical elements of the present principles. The following summary merely presents some aspects of the present principles in a simplified form as a prelude to the more detailed description provided below.

The present principles propose a revertible lightness mapping that reduces the lightness alteration made by the linear lightness mapping. This is achieved by introducing a preservation area, in which the lightness is kept constant, and by using a parabola to keep the output lightness mapped values close to the input lightness values as much as possible.

According to a first aspect a method for gamut mapping a color from a first color gamut towards a second color gamut is disclosed. The method comprises, in a plane of constant hue, obtaining a target lightness for a color (source cusp color) on the boundary of first gamut with maximum chroma, called first cusp color; and lightness mapping of the color from the first color gamut towards the second color gamut wherein the lightness mapped color is calculated from a parabolic function applied to the color, the parabolic function mapping the first cusp color to a color having the target lightness.

According to a specific characteristic, a preserved chroma (C0) is obtained and the lightness mapping of the color from the first color gamut towards the second color gamut further comprises:
in case a chroma of the color is lower than or equal to the preserved chroma, the lightness mapped color is the color, and
in case the chroma of the color is higher than the preserved chroma, the lightness mapped color is calculated from the parabolic function applied to the color.

According to another specific characteristic, the preserved chroma is obtained from a ratio of the chroma of the first cusp color.

According to another specific characteristic, the target lightness corresponds in the plane of constant hue to the lightness of a second cusp color (target cusp color) on the boundary of second gamut with maximum chroma.

According to another specific characteristic, the color is selected from a group of primary colors and of secondary colors.

According to another specific characteristic, obtaining the target lightness and the preserved chroma comprises receiving metadata relative to parameters used for invertible gamut mapping.

According to a second aspect, a device for gamut mapping from a first color gamut towards a second color gamut is disclosed. The device comprises a processor configured to obtain a target lightness for a color on the boundary of first gamut with maximum chroma, called first cusp color; and lightness map the color from the first color gamut towards the second color gamut wherein, in a plane of constant hue, the lightness mapped color is calculated from a parabolic function applied to the color, the parabolic function mapping the first cusp color to a color having the target lightness. In a variant, the device for gamut mapping a color from a first color gamut towards a second color gamut comprises means for obtaining a target lightness for a color on the boundary of first gamut with maximum chroma, called first cusp color; and for performing lightness mapping of the color from the first color gamut towards the second color gamut wherein the lightness mapped color is calculated from a parabolic function applied to the color, the parabolic function mapping the first cusp color to a color having the target lightness.

According to a third aspect, a signal having a SDR video and parameter values used for invertible color gamut mapping is disclosed. The signal is further formatted to comprise lightnessMappingMode, ImWeightFactor for implementing the invertible color gamut mapping.

According to a fourth aspect, a non-transitory processor-readable medium whose contents store a SDR video and metadata relative to parameters used for invertible color gamut mapping, the non-transitory processor-readable medium further comprises comprise lightnessMappingMode, ImWeightFactor for implementing the invertible color gamut mapping.

According to a fifth aspect, a computer program product comprising program code instructions to execute the steps of the disclosed method when this program is executed on a computer is disclosed.

According to a sixth aspect, a processor readable medium is disclosed that has stored therein instructions for causing a processor to perform at least the steps of the disclosed method.

According to a seventh aspect, a non-transitory program storage device is disclosed that is readable by a computer, tangibly embodies a program of instructions executable by the computer to perform the disclosed method.

While not explicitly described, the present embodiments may be employed in any combination or sub-combination. Besides, any characteristic or embodiment described for the method is compatible with a device intended to process the disclosed method and with a computer-readable storage medium storing program instructions.

4. BRIEF DESCRIPTION OF DRAWINGS

In the drawings, examples of the present principles are illustrated. It shows:

FIG. 1a illustrates a color gamut mapping in a hue leaf in accordance with prior art;

FIG. 1b illustrates a color gamut mapping in another hue leaf in accordance with prior art;

FIG. 1c illustrates a color gamut mapping in a hue leaf in accordance with prior art;

Similar or same elements are referenced with the same reference numbers.

Figure 2:
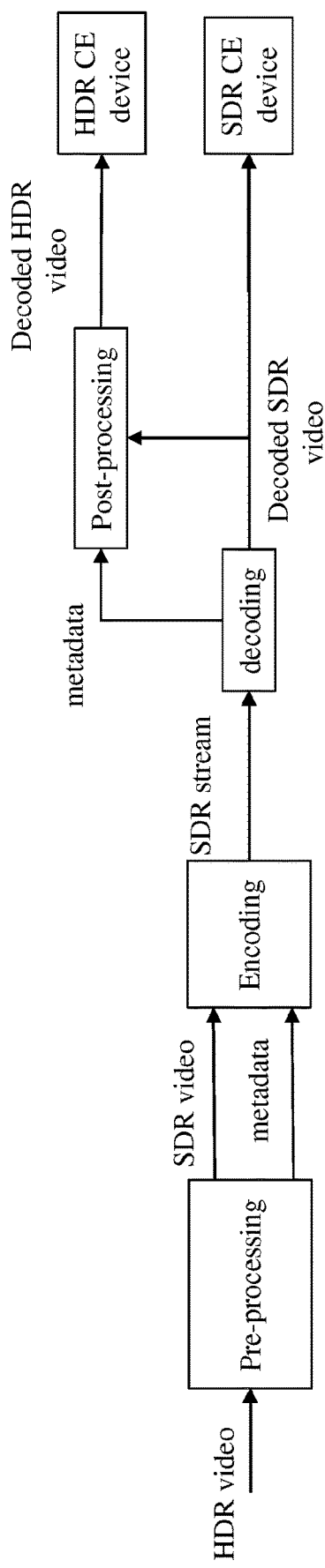
FIG. 2 shows an end-to-end workflow supporting content production and delivery to HDR and SDR displays.

5. Description of Example of the Present Principles

The present principles will be described more fully hereinafter with reference to the accompanying figures, in which examples of the present principles are shown. The present principles may, however, be embodied in many alternate forms and should not be construed as limited to the examples set forth herein. Accordingly, while the present principles are susceptible to various modifications and alternative forms, specific examples thereof are shown by way of examples in the drawings and will herein be described in detail. It should be understood, however, that there is no intent to limit the present principles to the particular forms disclosed, but on the contrary, the disclosure is to cover all modifications, equivalents, and alternatives falling within the spirit and scope of the present principles as defined by the claims.

The terminology used herein is for the purpose of describing particular examples only and is not intended to be limiting of the present principles. As used herein, the singular forms "a", "an" and "the" are intended to include the plural forms as well, unless the context clearly indicates otherwise. It will be further understood that the terms "comprises", "comprising," "includes" and/or "including" when used in this specification, specify the presence of stated features, integers, steps, operations, elements, and/or components but do not preclude the presence or addition of one or more other features, integers, steps, operations, elements, components, and/or groups thereof. Moreover, when an element is referred to as being "responsive" or "connected" to another element, it can be directly responsive or connected to the other element, or intervening elements may be present. In contrast, when an element is referred to as being "directly responsive" or "directly connected" to other element, there are no intervening elements present. As used herein the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element without departing from the teachings of the present principles.

Although some of the diagrams include arrows on communication paths to show a primary direction of communication, it is to be understood that communication may occur in the opposite direction to the depicted arrows.

Some examples are described with regard to block diagrams and operational flowcharts in which each block represents a circuit element, module, or portion of code which comprises one or more executable instructions for implementing the specified logical function(s). It should also be noted that in other implementations, the function(s) noted in the blocks may occur out of the order noted. For example, two blocks shown in succession may, in fact, be executed substantially concurrently or the blocks may sometimes be executed in the reverse order, depending on the functionality involved.

Reference herein to "in accordance with an example" or "in an example" means that a particular feature, structure, or characteristic described in connection with the example can be included in at least one implementation of the present principles. The appearances of the phrase "in accordance with an example" or "in an example" in various places in the specification are not necessarily all referring to the same example, nor are separate or alternative examples necessarily mutually exclusive of other examples.

Reference numerals appearing in the claims are by way of illustration only and shall have no limiting effect on the scope of the claims.

While not explicitly described, the present examples and variants may be employed in any combination or sub-combination.

The present principles are described for decoding an image but extends to the decoding of a sequence of images (video) because each image of the sequence is sequentially encoded/decoded as described below.

FIG. 2 shows an end-to-end workflow supporting content production and delivery to HDR and SDR displays. It involves a single-layer SDR/HDR encoding-decoding with side metadata as defined, for example, in the ETSI recommendation ETSI TS 103 433. The reader may also refer to the IBC 2016 article ("A single-Layer HDR video coding framework with SDR compatibility", E. François and L. Van de Kerkhof, IBC 2016) for more details.

At a pre-processing stage, an incoming HDR video is decomposed in an SDR video and metadata. The SDR video is then encoded with any SDR video codec and an SDR bitstream is carried throughout an existing SDR distribution network with accompanying metadata conveyed on a specific channel or embedded in the SDR bitstream.

Preferably, the video coded is an HEVC codec such as the H.265/HEVC codec or H.264/AVC.

The metadata are typically carried by SEI messages when used in conjunction with an H.265/HEVC or H.264/AVC codec.

The SDR bitstream is decoded and a decoded SDR video is then available for an SDR Consumer Electronics (CE) display.

Next, at a post-processing stage, which is functionally the inverse of the pre-processing stage, the HDR video is reconstructed from the decoded SDR video and metadata obtained from a specific channel or from the SDR bitstream.

Figure 3A:
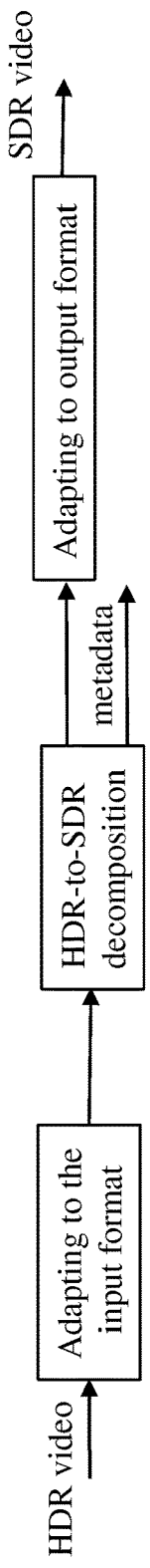
FIG. 3a depicts in more details the pre-processing stage.

FIG. 3a depicts in more details the pre-processing stage.

The core component of the pre-processing stage is the HDR-to-SDR decomposition that generates an SDR video and metadata from the HDR video.

More precisely, the HDR-to-SDR decomposition aims at converting a HDR video represented in a specific input format to a SDR video represented in a specific output format according to the embodiment disclosed below but the present principles are not limited to specific input/output format (color space or gamut).

Optionally, the format of the HDR video, respectively the format of the SDR video, may be adapted to said specific input format, respectively specific output format.

Said input/output format adapting may include color space conversion and/or color gamut mapping. Usual format adapting processes may be used such as RGB-to-YUV or YUV-to-RGB conversion, BT.709-to-BT.2020 or BT.2020-to-BT.709, down-sampling or up-sampling chroma components, etc.

The HDR-to-SDR decomposition aims at converting an input linear-light 4:4:4 RGB HDR video to an SDR compatible version. The process uses static metadata such as the color primaries and gamut of the container of the HDR and SDR images.

Optionally, the format of the HDR video may be previously adapted to the pre-determined input format of the pre-processing stage and/or a gamut mapping may be used when the HDR video (input of the HDR decomposition stage) and SDR video (output of the HDR decomposition stage) are represented in different color spaces.

Figure 3B:
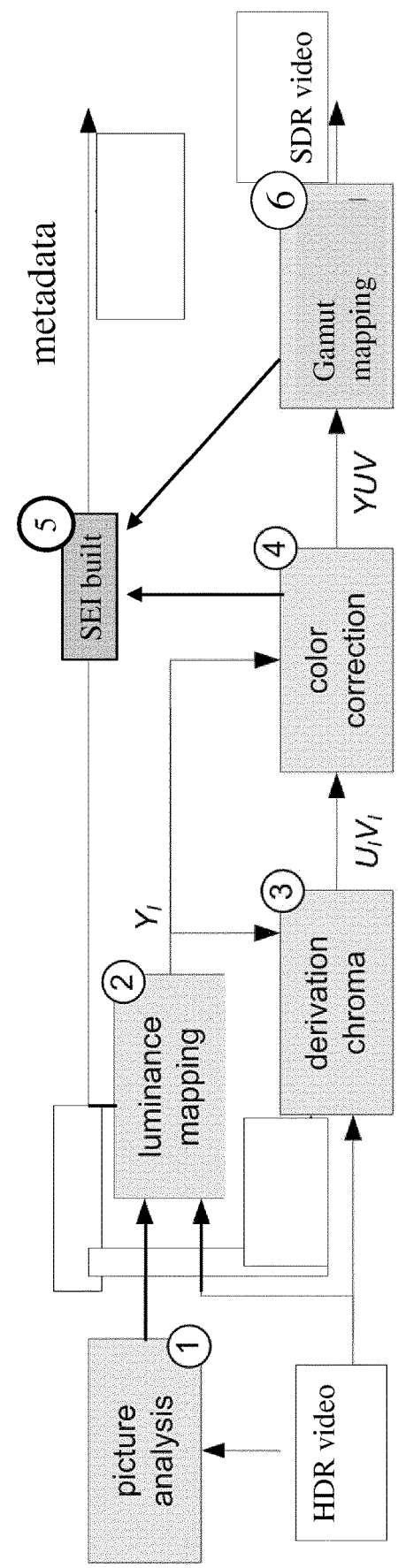
FIG. 3b depicts the HDR-to-SDR decomposition in more details.

FIG. 3b depicts the HDR-to-SDR decomposition in more details.

In the following, the HDR video samples are represented in the RGB color space (specific input format) and the SDR video samples are represented in the RGB color space (specific output format).

In step 1, the HDR video is analyzed image per image in order to derive a set of mapping parameters that will be further used to convert the HDR video into SDR video.

In step 2, the luminance component L of a current image of the HDR video to be decomposed, is luminance mapped to an SDR luma component $Y_l$. The resulting signal is the SDR luma (the SDR luma component $Y_l$) given by:

$$L = A_1 \begin{bmatrix} R \\ G \\ B \end{bmatrix} \quad (1)$$

$$Y_l = TM[L] \quad (2)$$

where $A=[A_1 A_2 A_3]^T$ is the canonical 3×3 R'G'B'-to-Y'CbCr conversion matrix (e.g. as specified in ITU-R Rec. BT.2020 or ITU-R Rec. BT.709 depending on the color space), $A_1 A_2 A_3$ being 1×3 matrices.

In step 3 in FIG. 3b, the chroma components are derived as follows. First the R, G, B values of the input HDR video are scaled by the ratio ($Y_l$/L), which results in a linear-light SDR version of RGB. Then a square-root is applied, to reproduce a transfer function close to the ITU-R Rec. BT.709 OETF (Opto-Electrical Transfer Function). Note that the usage of a square root guarantees the reversibility of the process.

The resulting R, G, B signal is converted to chroma components $U_l$, $V_l$:

$$\begin{bmatrix} U_l \\ V_l \end{bmatrix} = \sqrt{\frac{Y_l}{L}} * \begin{bmatrix} A_2 \\ A_3 \end{bmatrix} * \begin{bmatrix} \sqrt{R} \\ \sqrt{G} \\ \sqrt{B} \end{bmatrix} \quad (3)$$

In step 4, a final color correction is applied in order to match the SDR colors to the HDR video colors. First the chroma components are adjusted by a scaling factor $1/\beta(Y_l)$, where $\beta(Y_l)$ is a function that enables control of the color saturation and hue of the resulting SDR video.

$$\begin{bmatrix} U_{SDR} \\ V_{SDR} \end{bmatrix} = \frac{1}{\beta(Y_l)} * \begin{bmatrix} U_l \\ V_l \end{bmatrix} \quad (4)$$

This step allows control of the SDR colors and to guarantee their matching to the HDR colors.

In step 6, an invertible gamut mapping process could apply when the input SDR picture of the SDR-to-HDR reconstruction process is provided in a BT.709 color gamut (as specified by the variable prePicColourSpace), and is different from the target BT.2020 color gamut of the HDR picture (as specified by the variable recPicColourSpace). Color backward compatibility is defined such that the SDR CE receiver only supports BT.709 color space while the video to be distributed using SL-HDR1 can support BT.2020 color space. When recPicColourSpace is not equal to prePicColourSpace, at the HDR-to-SDR decomposition side the WCG HDR video shall be converted to a standard color gamut SDR video (plus metadata) while the inverse process at the HDR reconstruction side reverts this conversion by rendering the WCG HDR video from the standard color gamut SDR video (plus metadata). The cascading of those two color processes should be visually lossless, while the standard color gamut SDR video should entirely preserve the artistic intent of the original WCG HDR video with minimal impairments. Both color reconstruction (inverse gamut mapping) and compression (gamut mapping) conversions are specified to be reciprocal.

In step 5, metadata relative to the luminance mapping (step 2), color correction (step 4) and invertible color gamut mapping (step 6) are conveyed to the post-processing stage. The metadata are conveyed as static metadata (in case parameters do not change with the picture) or dynamic metadata (in case parameters change with the picture as for luminance mapping).

These metadata enable fine control of the texture and colors of the SDR version, and to ensure a good fitting to the HDR intent.

FIG. 3a depicts in more details the post-processing stage.

The core component of the post-processing stage is the SDR-to-HDR reconstruction that reconstructs an HDR video from a (decoded) SDR video and metadata.

More precisely, the HDR reconstruction aims at converting SDR video represented in a specific input format to an output HDR video represented in a specific output format according to the embodiment disclosed below but the present principles are not limited to specific input/output specific formats (color space or gamut).

Said input or output format adapting may include color space conversion and/or color gamut mapping. Usual format adapting processes may be used such as RGB-to-YUV or YUV-to-RGB conversion, BT.709-to-BT.2020 or BT.2020-to-BT.709 etc. For example, see Annex D of the ETSI recommendation ETSI TS 103 433 provides use cases of inverse gamut mapping.

Optionally, the format of the reconstructed HDR video may be adapted to a targeted system characteristics (e.g. a Set-Top-Box, a connected TV) and/or an inverse gamut mapping may be used when the decoded SDR video (input of the HDR reconstruction stage) and the reconstructed HDR video (output of the HDR reconstruction stage) are represented in different color spaces and/or gamut.

FIG. 3b depicts in more details the HDR reconstruction process.

The HDR reconstruction is the functional inverse of the HDR-to-SDR decomposition (FIG. 2b). However, for implementation complexity reasons, some operations are concatenated or applied in a different order.

In step 31, dynamic and/or static metadata are obtained, for example from the SDR bitstream or from a specific channel.

In step 32, a luminance-mapping look-up-table lutMapY (a 1D look-up table) is derived from the obtained metadata. This luminance-mapping look-up-table corresponds to the inverse of the square-root of the luminance mapping curve.

In step 33, a color-correction look-up-table lutCC is derived from the obtained dynamic metadata. The color-correction look-up-table lutCC is linked to the pre-processing color correction $\beta_p(Y_1)$ (equation 4) and the luminance-mapping look-up table lutMapYby the following equation:

$$\beta[Y]=2^B \times lutMapY[Y] \times lutCC[Y] \quad (5)$$

where B is the bit-depth of the luma component of the decoded SDR image.

In step 34, an image of the reconstructed HDR video (linear-light HDR video) is reconstructed by applying a HDR reconstruction to an image of the decoded SDR video using the derived luma-related look-up table lutMapY and the derived color correction look-up table lutCC. In step 36, the color reconstruction or inverse gamut mapping process enables the generation of a wide color gamut picture from a standard color gamut picture with associated metadata. This process is defined for a 4:4:4 chroma sampling and full range YUV linear-light signal. The input YUV signal comes from the conversion of an input RGB linear-light signal (output of the SDR-to-HDR reconstruction process 34) to a YUV color space thanks to the canonical R'G'B'-to-Y'CbCr matrix (computed thanks to SMPTE RP 177 [i.8]). This process further comprises a chroma remapping, a lightness remapping according to the described embodiments and a hue remapping.

The post-processing operates on a luminance-mapping look-up table lutMapY (step 32), a color correction look-up table lutCC (step 33), and inverse gamut mapping parameters (step 35) defining a preservation area that keeps the lightness unchanged for less saturated colors, and the amount of lightness correction required per primary and secondary colors. The respective table and parameters are derived from metadata (step 31).

The metadata may be conveyed (step 5) as dynamic metadata according to either a so-called parameter-based mode or a table-based mode in order to derive the luminance-mapping look-up-table lutMapY (step 32), and the color-correction look-up-table lutCC (step 33) from obtained dynamic metadata (step 31). The metadata relative to inverse color gamut mapping may be conveyed (step 5) as static metadata. Some metadata to be conveyed in step 5 are lightness mapping parameters representative of a lightness mapping method, a preservation area that keeps the lightness unchanged for less saturated colors, and of a lightness color correction required per primary and/or secondary colors for colors with higher saturation (ETSI recommendation ETSI TS 103 433 clause 6.3.10). Accordingly the following parameters are described lightnessMappingMode and ImWeightFactor.

lightnessMappingMode

This variable indicates the mode of lightness mapping used by the invertible color gamut mapping. The value of lightnessMappingMode shall be as defined in the following table:

| Value of lightnessMappingMode | Definition |
| --- | --- |
| 0 | Lightness mapping disabled |
| 1 | Lightness mapping applied to each primary and secondary colour |
| 2 | Lightness mapping applied to yellow and magenta secondary colours and red primary colour |
| 3 | Lightness mapping with weighting factor applied to each primary and secondary colour |

ImWeightFactor

This array of six variables specifies the weight to be applied to each primary and secondary color during the lightness mapping process. This array shall be invoked only when lightnessMappingMode is equal to 3. The index value c equal to 0 should correspond to the red primary, c equal to 1 should correspond to the magenta secondary, c equal to 2 should correspond to the blue primary, c equal to 3 should correspond to the cyan secondary, c equal to 4 should correspond to the green primary, c equal to 5 should correspond to the yellow secondary. The value of ImWeightFactor[c] shall be in the bounded range [0 to 1] and in multiples of (1÷4).

These metadata may be conveyed using the HEVC Colour Volume Reconstruction Information (CVRI) user data registered SEI message whose syntax is based on the SMPTE ST 2094-20 specification (ETSI recommendation ETSI TS 103 433 Annex A.3).

In step 31, the CVRI SEI message is thus parsed to obtain the luminance mapping parameters, the color correction parameters and the inverse gamut parameters.

In step 32, the luminance-mapping look-up-table lutMapY is reconstructed (derived) from the obtained luminance mapping parameters (see ETSI TS 103 433 clause 7.2.3.1 for more details).

In step 33, the color-correction look-up-table lutCC is reconstructed (derived) from the obtained color correction parameters (see ETSI TS 103 433 clause 7.2.3.2 for more details).

In step 35, the features for the lightness mapping are determined (derived) from the obtained inverse gamut mapping parameters as described hereafter with the color gamut mapping method. The lightness remapping parameters offer the possibility to either do a global remapping for all colors, or to only remap warm colors (such as yellow, red and magenta corresponding to the colors for which the boundary source color is brighter than the boundary target color) or to weight the lightness remapping of each individual primary and secondary color.

These metadata may be conveyed as dynamic metadata using the HEVC Colour Remapping Information (CRI) SEI message whose syntax is based on the SMPTE ST 2094-30 specification (ETSI recommendation ETSI TS 103 433 Annex A.4).

Note that static metadata may also be used by the post-processing stage and conveyed by SEI message. For example, the lightnessMappingMode and lmWeightFactor may be carried by the TS 103 433 Information (TSI) user data registered SEI message (payloadMode) as defined by ETSI TS 103 433 (clause A.2.2). Static metadata such as, for example, the color primaries or the maximum display mastering display luminance are conveyed by a Mastering Display Colour Volume (MDCV) SEI message as defined in AVC, HEVC.

Figure 4A:
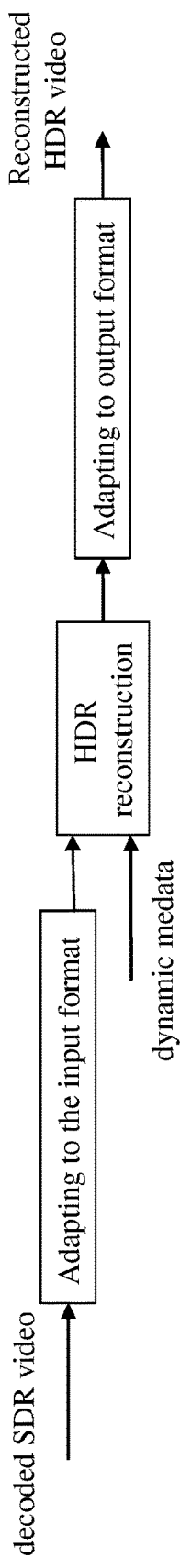
FIG. 4a depicts in more details the post-processing stage.
Figure 4B:
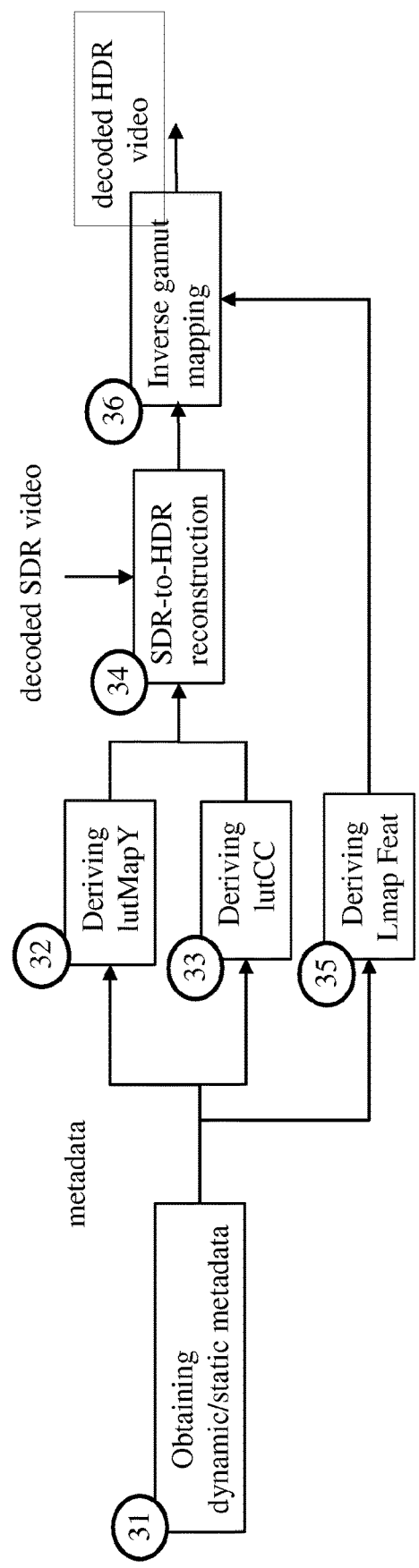
FIG. 4b depicts in more details the HDR reconstruction process.
Figure 5:
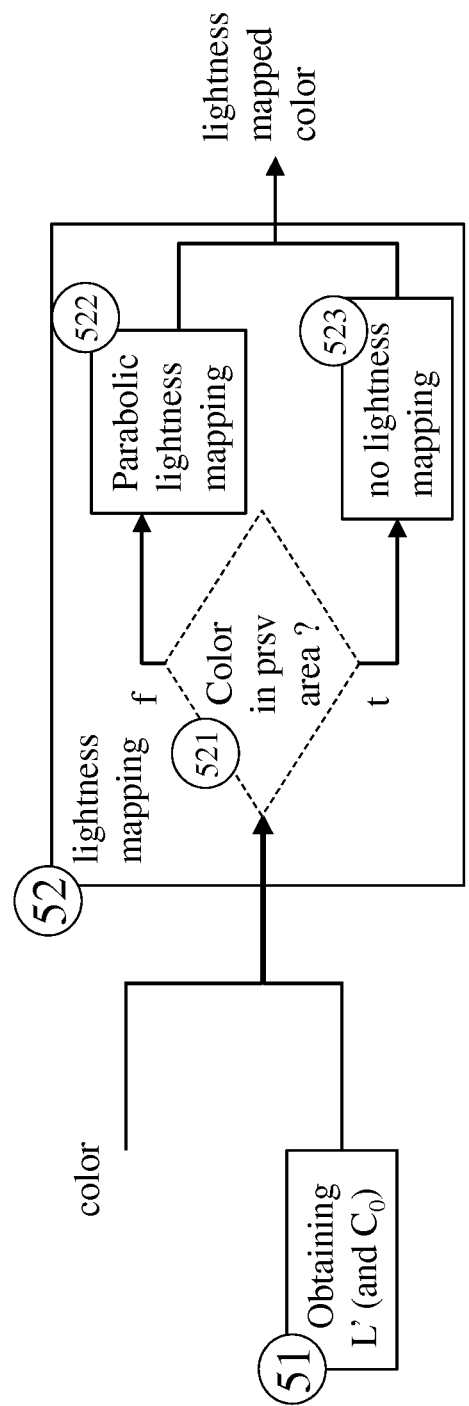
FIG. 5 shows a block diagram of the steps of a method for invertible color gamut mapping in accordance with examples of the present principles.

FIG. 5 shows a block diagram of the steps of a method for invertible gamut mapping in accordance with examples of the present principles. This method is compatible on any HDR-to-SDR decomposition process producing a SDR image and metadata. For illustrative purpose, the gamut mapping method is part (step 6) of the HDR-to-SDR decomposition process as described in relation with FIG. 3b. This process is particularly adapted when the wide color gamut HDR video shall be converted to a standard color gamut SDR video. Advantageously, the lightness mapping according to the present principles achieves a good trade-off between saturation and lightness in order to get a better preservation of the intent of the source colors of the HDR image. As shown on FIG. 6a and FIG. 6b, the higher the chroma the stronger the lightness correction. However, since this method is fully invertible, the method is also compatible with any SDR-to-HDR reconstruction process producing a HDR image. For illustrative purpose, the gamut mapping method is also part (step 36) of the SDR-to-HDR reconstruction process as described in relation with FIG. 4b. This process is particularly adapted when the standard color gamut SDR video shall be converted back to a wide color gamut HDR video. Advantageously, the inverse gamut mapping reverts the lightness correction applied at the encoder side. The lightness is corrected while keeping the hue and saturation unchanged. However the method is also compatible with any process involving color gamut mapping from a first color gamut towards a second color gamut. The HDR video samples and the SDR video samples can be represented in any color space such as YUV, CIELUV, L*a*b* or IPT. For illustrative purpose, a HDR video sample, called color, is represented in a plane having a constant hue, known as hue leaf as shown on FIG. 6a and FIG. 6b.

In a preliminary step 51, a target lightness (L') for a color on the boundary of first gamut (source gamut) with maximum chroma, called first cusp color (source cusp color), is obtained. The first cusp color (source cusp color) belongs to the boundary of first gamut (source gamut) with maximum chroma as shown on FIG. 6a and FIG. 6b. A target lightness (L') for the first cusp color is obtained. According to a particular variant, the target lightness (L') corresponds to the lightness of a second cusp color (target cusp color) on the boundary of second gamut (target gamut) with maximum chroma in the same hue leaf as shown on FIG. 6a and FIG. 6b. The target lightness is thus representative of the amount of lightness correction applied to any color of the first color gamut included in this hue leaf. In specific alternative variants, the value of the target lightness is obtained from a ratio (or percentage) of the difference of lightness values between the lightness of a second cusp color (target cusp color) and the lightness of a first cusp color (source cusp color). In a variant, a preserved chroma ($C_0$) is also obtained. The preserved chroma ($C_0$) defines a preservation area around the lightness axis which corresponds to less saturated colors. In specific alternative variants, the value of the preserved chroma is obtained from a ratio (or percentage) of the value of the chroma ($C_1$) of the first cusp color, i.e. the maximum chroma in the first color gamut, for instance 0.3 or 30%, but is more generally in an interval [0-1] or [0%-100%]. According to a particular characteristic, colors with chroma smaller than or equal to the preserved chroma ($C_0$) are not modified, (meaning in that case that the lightness is unchanged for less saturated colors) and colors with chroma greater than the preserved chroma ($C_0$) are lightness mapped according to the revertible parabolic lightness mapping as detailed hereafter. In a HDR-to-SDR decomposition process, colors and corresponding preserved colors are defined and coded as parameters for invertible gamut mapping as exposed above. The lightness mapping parameters used for invertible gamut mapping are then sent metadata for inverse gamut mapping. In the SDR-to-HDR reconstruction process, metadata relative to parameters used for invertible gamut mapping are received, and colors and corresponding preserved chroma are derived from the received parameters. According to a particular characteristic, the color is a key color selected from a group of primary colors and of secondary colors. As previously explained with regards to the variable lightnessMappingMode, the lightness mapping is applied to each primary and secondary color, or to only to part of them such as yellow and magenta secondary colors and red primary color, or with a weighting factor applied to each primary and secondary color. The weighting factors are representative of the amount of lightness correction applied to any color of the first color gamut included in the corresponding hue leaf. According to a non-limiting example, a factor of 100% is applied to yellow and magenta secondary colors and red primary color, and a factor of 50% is applied for blue and green primary colors and cyan secondary. In this example as shown on FIG. 6a, the target lightness (L') for the yellow cusp color corresponds to the lightness of the target color (target cusp color) on the boundary of second gamut (target gamut) with maximum chroma in the same hue leaf. According to another non-limiting example, a factor of 50% is applied to yellow and magenta secondary colors and red primary color, and a factor of 0% is applied for blue and green primary colors and cyan secondary. In this example as (partially) shown on FIG. 6b, the target lightness (L") for the yellow cusp color corresponds to the arithmetic average ((L+L')/2) of lightness of the source cusp color and of the target color on the boundary of second gamut (target gamut) with maximum chroma in the same hue leaf. In other words, the weighing factor defines the target lightness as a linear interpolation between the lightness (L) of the source cusp color and the lightness of the target cusp color. The parameters for preserved chroma ($C_0$) and/or target lightness (L') are advantageously sent/received for the key colors, thus limiting the size of metadata. According to the characteristic where the color is any color (meaning not a key color), the values of preserved chroma ($C_0$) and target lightness (L') for the color are interpolated from the corresponding values for key colors. Lightness mapping may be advantageously limited to some hues, e.g. for which the lightness of the cusp color is higher in the source color gamut than in the target color gamut as shown on FIG. 1a.

In a step 52, a parabolic lightness mapping of the color from the first color gamut towards the second color gamut is applied. In the particular characteristic of the preserved area, in a sub-step 521, the condition of the color belonging to the preserved area is tested. In case the chroma of the color is below the preserved chroma (true condition), the lightness mapped current color is the current color, no lightness mapping (523) is performed for that color as shown on FIG. 6a. In case the chroma of the color is above the preserved chroma (false condition), the lightness mapped current color is calculated from a parabolic function applied to the color. The parabolic function maps the first cusp color (source cusp color) to a color (lightness mapped cusp color) having the target lightness (L'). As previously exposed, the target lightness (L') is for instance the lightness of a second cusp color (target cusp color) on the boundary of second gamut (target gamut) with maximum chroma. Accordingly, for a color having coordinates ($C_{in}$, $L_{in}$) in a hue leaf, and the first cusp color having coordinates of ($C_{cusp}$, $L_{cusp}$) the mapped lightness $L_{out}$ is given by the following formula:

$$L_{out} = L_{in} \text{ for } C_{in} \leq C_0 \qquad (6)$$

$$L_{out} = L_{in} + (L' - L_{cusp}) \cdot \left(\frac{C_{in} - C_0}{C_{cusp} - C_0}\right)^2 \text{ for } C_{in} > C_0$$

Figures 6A, 6B:
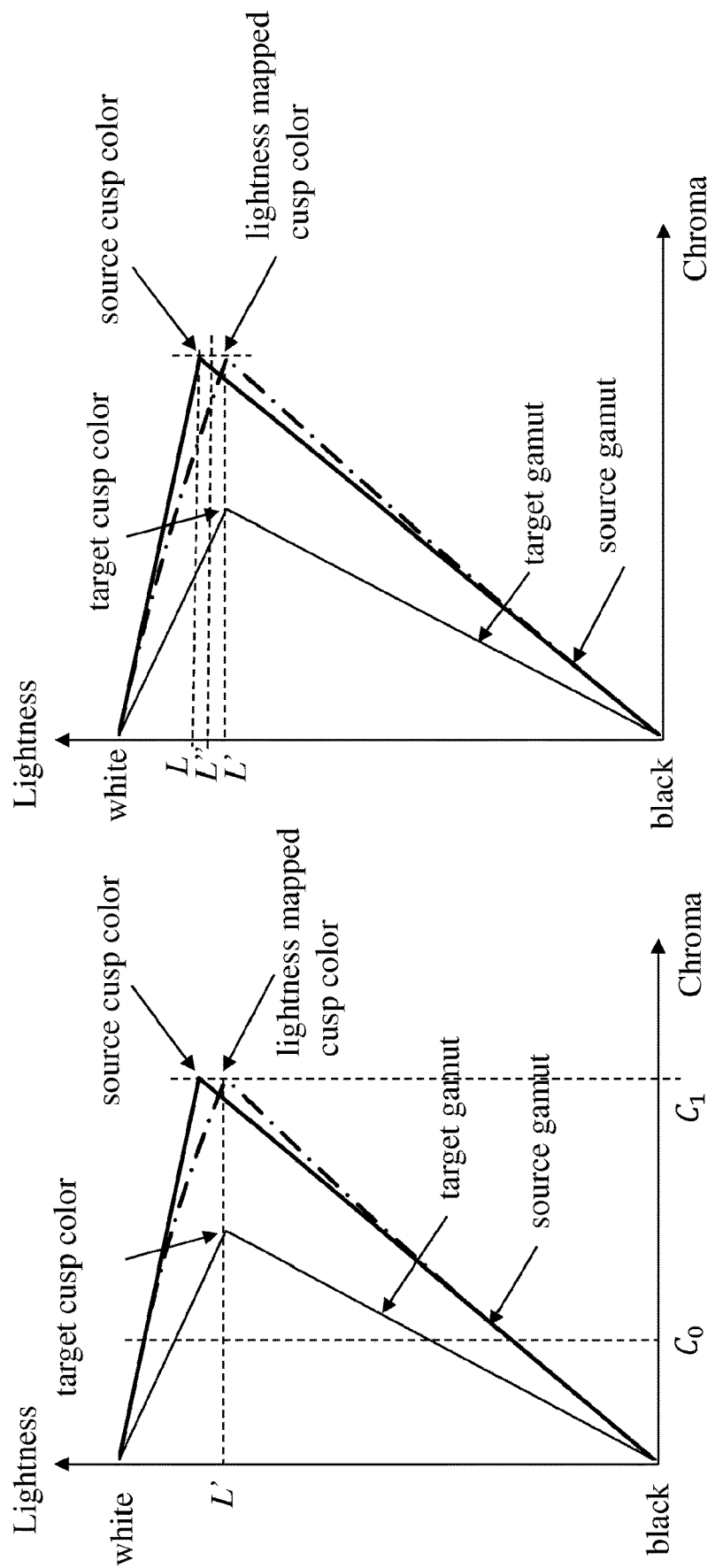
FIG. 6a illustrates the lightness mapping in a hue leaf in accordance with examples of the present principles.
FIG. 6b illustrates the lightness mapping in a hue leaf in accordance with examples of the present principles.

Although, the characteristic of the preservation area is presented as part of the gamut mapping method, the parabolic lightness mapping can be applied to the whole hue leaf without preserved gamut as illustrates on FIG. 6b. This corresponds to having the parameter for preserved chroma ($C_0$) being equal to zero.

Advantageously, the lightness mapping which is applied on the HDR-to-SDR decomposition process is used to improve contrast, notably for ramps of colors. Indeed, the curvature of the parabolic lightness mapping function at the boundary of the preservation area is continuous (i.e. the derivative is continuous). The continuity of the parabolic lightness mapping function curvature is achieved by the quadraticity for chroma value $C_{in}$.

This compensation is reverted in the inverse gamut mapping process in the SDR-to-HDR reconstruction process. Indeed, as the lightness mapping function is linear for lightness value $L_{in}$, it can be easily reversed using the following formula:

$$L_{out} = L_{in} \text{ for } C_{in} \leq C_0 \qquad (7)$$

$$L_{out} = L_{in} + (L' - L_{cusp}) \cdot \left(\frac{C_{in} - C_0}{C_{cusp} - C_0}\right)^2 \text{ for } C_{in} > C_0$$

For the sake of completeness, an invertible chroma mapping method associated with the disclosed parabolic lightness mapping is now disclosed. Advantageously the disclosed parabolic lightness mapping is compliant with known chroma mapping methods for backward and forward gamut mapping. Indeed, the parabolic lightness mapping modifies the gamut boundaries which are no longer rectilinear. In XYZ, the color gamuts of trichromatic displays as well as the color gamuts of the TV standards (rec.709, rec.2020 . . . ) are quadrilateral-faced hexahedra. In each hue leaf, these gamut boundaries are made of two linear parts: one line joining the black to the cusp color, and another one joining the cusp color to the white as shown on FIG. 1a to FIG. 1c. After a linear lightness mapping, these boundary lines are modified but stay linear on FIG. 1c., but after the disclosed parabolic lightness mapping, these boundary lines are, at least partially, modified into parabola. Therefore, an adaptation of the chroma mapping is needed.

The chroma mapping usually maps the colors while keeping hue and lightness constant, i.e. the output color is on the same constant lightness line in the same constant hue leaf as the lightness-mapped color. As shown on FIG. 1a, a linear chroma mapping linearly maps the colors on each constant lightness line such that the color with the highest chroma value (source yellow) on this line is mapped to the color of the target gamut boundary on this constant lightness line (mapped yellow at constant lightness). The ratio between these two values is applied to the value of chroma of any of the colors on this constant lightness line. Thus, the intersection between the gamut boundary and the constant lightness line needs to be determined. As seen previously in case of a linear lightness mapping the source gamut boundary stays linear, and thus, for a linear chroma mapping intersections between lines need to be computed. As shown on FIG. 1c, a linear chroma mapping, performed after a linear lightness mapping, maps the colors on each constant lightness line such that the color with the highest chroma value (Linear lightness mapped yellow) on this line is mapped to the color of the target gamut boundary on this constant lightness line (mapped yellow). As shown on FIG. 1c, in case of a linear lightness mapping that maps the lightness of the source cusp with the lightness of the target cusp, this linear chroma mapping applies a same ratio to all colors of a constant hue leaf (because the constant lightness lines are similar to each other).

However, after the proposed parabolic lightness mapping, the boundary lines are, at least partially, modified into parabola. So that, instead of intersections between lines, intersections between lines and parabola are needed. The computation of the intersection between the lightness mapped gamut boundary and the constant lightness line is now disclosed. Before lightness mapping, the equation of the source gamut boundary is:

$$C_{boundary} = \frac{L_{in}}{L_{cusp}} \cdot C_{cusp} \text{ for } L_{in} \leq L_{cusp}$$

After the proposed parabolic lightness mapping, the equation of the gamut boundary becomes:

$$\text{for } L_{out} \leq \frac{C}{C_{cusp}} \cdot L_{cusp}, \qquad (9)$$

$$C_{boundary} = \frac{L_{out}}{L'_{cusp}} \cdot C_{cusp}$$

$$\text{for } \frac{C_0}{C_{cusp}} \cdot L_{cusp} < L_{out} \leq L'_{cusp},$$

$C_{boundary}$ is defined as the unique value in $[C_0, C_{cusp}]$ such that:

$$L_{out} = \frac{C_{boundary}}{C_{cusp}} \cdot L_{cusp} + (L'_{cusp} - L_{cusp}) \cdot \left(\frac{C_{boundary} - C_0}{C_{cusp} - C_0}\right)^2 \quad (10)$$

$$\text{for } L'_{cusp} < L_{out} < L_{white} - \frac{C_0}{C_{cusp}} \cdot (L_{white} - L'_{cusp}),$$

$C_{boundary}$ is defined as the unique value in $[C_0, C_{cusp}]$ such that:

$$L_{out} = L_{white} - (L_{white} - L_{cusp}) \cdot \frac{C_{boundary}}{C_{cusp}} + \quad (11)$$
$$(L'_{cusp} - L_{cusp}) \cdot \left(\frac{C_{boundary} - C_0}{C_{cusp} - C_0}\right)^2$$

and for $$L_{out} \geq L_{white} - \frac{C_0}{C_{cusp}} \cdot (L_{white} - L'_{cusp}),$$

$$C_{boundary} = \frac{L_{white} - L_{out}}{L_{white} - L'_{cusp}} \cdot C_{cusp} \quad (12)$$

These equations are used to determine the gamut boundary of the source colors after the proposed parabolic lightness mapping. On the other hand, the gamut boundary of the target color gamut is determined using the linear equations with the new lightness value $L_{out}$.

During the reverse mapping, since the lightness mapping is applied after the chroma mapping, the chroma mapping needs to take into account the future modification of the gamut of the mapped colors by the lightness mapping. Therefore, the gamut boundary of the source color gamut is determined using the linear equations, and the gamut boundary of the target color gamut is determined using the above equations (9) to (11) (both gamut boundaries are determined using the input lightness value).

This method is based on any HDR reconstruction process requiring a SDR image and dynamic metadata.

For illustrative purpose, the HDR reconstruction process may be the HDR reconstruction process as described in relation with FIG. 4b. In that case, the HDR image is reconstructed from a decoded SDR image. But, the SDR image, used for reconstructing an HDR image may also be stored with compression and obtained without requiring a decoding.

Then, the method obtains, for example by decoding a SDR bitstream, a (decoded) SDR image whose dynamic range of the luminance values is lower than the dynamic range of the luminance values of the HDR image to be reconstructed.

On FIG. 2-5b, the modules are functional units, which may or not be in relation with distinguishable physical units. For example, these modules or some of them may be brought together in a unique component or circuit, or contribute to functionalities of a software. A contrario, some modules may potentially be composed of separate physical entities. The apparatus which are compatible with the present principles are implemented using either pure hardware, for example using dedicated hardware such ASIC or FPGA or VLSI, respectively «Application Specific Integrated Circuit», «Field-Programmable Gate Array», «Very Large Scale Integration», or from several integrated electronic components embedded in a device or from a blend of hardware and software components.

Figure 7:
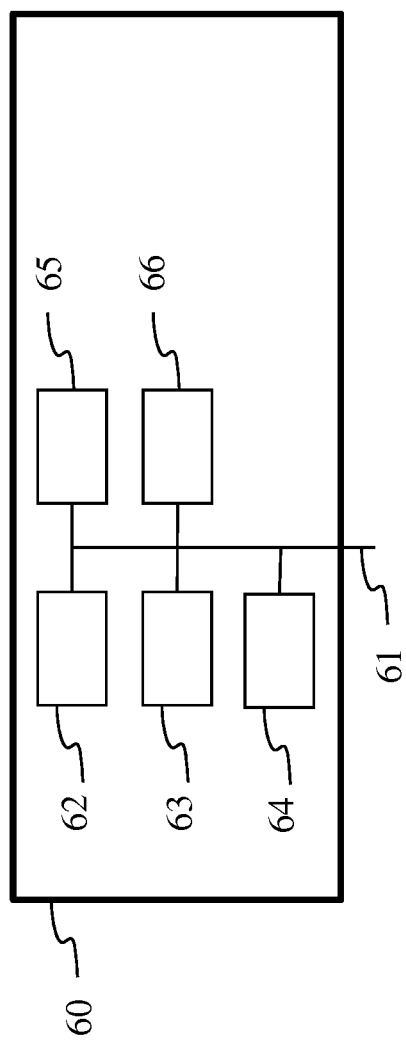
FIG. 7 shows an example of an architecture of a device in accordance with an example of present principles.
Figure 8:
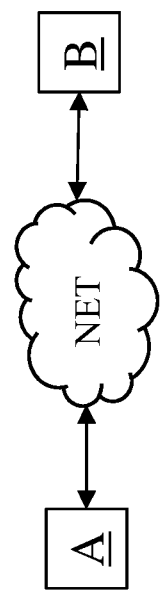
FIG. 8 shows two remote devices communicating over a communication network in accordance with an example of present principles.

FIG. 7 represents an exemplary architecture of a device 60 which may be configured to implement a method described in relation with FIG. 2-5b.

Device 60 comprises following elements that are linked together by a data and address bus 61:
  a microprocessor 62 (or CPU), which is, for example, a DSP (or Digital Signal Processor);
  a ROM (or Read Only Memory) 63;
  a RAM (or Random Access Memory) 64;
  an I/O interface 65 for reception of data to transmit, from an application; and
  a battery 66

In accordance with an example, the battery 66 is external to the device. In each of mentioned memory, the word «register» used in the specification can correspond to area of small capacity (some bits) or to very large area (e.g. a whole program or large amount of received or decoded data). The ROM 63 comprises at least a program and parameters. The ROM 63 may store algorithms and instructions to perform techniques in accordance with described embodiments. When switched on, the CPU 62 uploads the program in the RAM and executes the corresponding instructions.

RAM 64 comprises, in a register, the program executed by the CPU 62 and uploaded after switch on of the device 60, input data in a register, intermediate data in different states of the method in a register, and other variables used for the execution of the method in a register.

The implementations described herein may be implemented in, for example, a method or a process, an apparatus, a software program, a data stream, or a signal. Even if only discussed in the context of a single form of implementation (for example, discussed only as a method or a device), the implementation of features discussed may also be implemented in other forms (for example a program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

In accordance with an example of encoding or an encoder, the HDR video or an HDR image of a HDR video is obtained from a source. For example, the source belongs to a set comprising:
  a local memory (63 or 64), e.g. a video memory or a RAM (or Random Access Memory), a flash memory, a ROM (or Read Only Memory), a hard disk;
  a storage interface (65), e.g. an interface with a mass storage, a RAM, a flash memory, a ROM, an optical disc or a magnetic support;
  a communication interface (65), e.g. a wireline interface (for example a bus interface, a wide area network interface, a local area network interface) or a wireless interface (such as a IEEE 802.11 interface or a Bluetooth® interface); and
  an image capturing circuit (e.g. a sensor such as, for example, a CCD (or Charge-Coupled Device) or CMOS (or Complementary Metal-Oxide-Semiconductor)).

In accordance with an example of the decoding or a decoder, the decoded SRD video or reconstructed HDR video is sent to a destination; specifically, the destination belongs to a set comprising:
- a local memory (63 or 64), e.g. a video memory or a RAM, a flash memory, a hard disk;
- a storage interface (65), e.g. an interface with a mass storage, a RAM, a flash memory, a ROM, an optical disc or a magnetic support;
- a communication interface (65), e.g. a wireline interface (for example a bus interface (e.g. USB (or Universal Serial Bus)), a wide area network interface, a local area network interface, a HDMI (High Definition Multimedia Interface) interface) or a wireless interface (such as a IEEE 802.11 interface, WiFi® or a Bluetooth® interface); and
- a display.

In accordance with examples of encoding or encoder, the SDR bitstream and/or the other bitstream carrying the metadata are sent to a destination. As an example, one of these bitstream or both are stored in a local or remote memory, e.g. a video memory (64) or a RAM (64), a hard disk (63). In a variant, one or both of these bitstreams are sent to a storage interface (65), e.g. an interface with a mass storage, a flash memory, ROM, an optical disc or a magnetic support and/or transmitted over a communication interface (65), e.g. an interface to a point to point link, a communication bus, a point to multipoint link or a broadcast network.

In accordance with examples of decoding or decoder, the SDR bitstream and/or the other bitstream carrying the metadata is obtained from a source. Exemplarily, the bitstream is read from a local memory, e.g. a video memory (64), a RAM (64), a ROM (63), a flash memory (63) or a hard disk (63). In a variant, the bitstream is received from a storage interface (65), e.g. an interface with a mass storage, a RAM, a ROM, a flash memory, an optical disc or a magnetic support and/or received from a communication interface (65), e.g. an interface to a point to point link, a bus, a point to multipoint link or a broadcast network.

In accordance with examples, device 60 being configured to implement an encoding method as described above, belongs to a set comprising:
- a mobile device;
- a communication device;
- a game device;
- a tablet (or tablet computer);
- a laptop;
- a still image camera;
- a video camera;
- an encoding chip;
- a still image server; and
- a video server (e.g. a broadcast server, a video-on-demand server or a web server).

In accordance with examples, device 60 being configured to implement a decoding method as described above, belongs to a set comprising:
- a mobile device;
- a communication device;
- a game device;
- a set top box;
- a TV set;
- a tablet (or tablet computer);
- a laptop;
- a display and
- a decoding chip.

According to an example of the present principles, illustrated in FIG. 7, in a transmission context between two remote devices A and B over a communication network NET, the device A comprises a processor in relation with memory RAM and ROM which are configured to implement a method for encoding an image as described above and the device B comprises a processor in relation with memory RAM and ROM which are configured to implement a method for decoding as described above.

In accordance with an example, the network is a broadcast network, adapted to broadcast still images or video images from device A to decoding devices including the device B.

A signal, intended to be transmitted by the device A, carries the SDR bitstream and/or the other bitstream carrying the metadata. The SDR bitstream comprises an encoded SDR video as explained before. This signal further comprises metadata relative to parameter values used for reconstructing an HDR video from said decoded SDR video.

Implementations of the various processes and features described herein may be embodied in a variety of different equipment or applications. Examples of such equipment include an encoder, a decoder, a post-processor processing output from a decoder, a pre-processor providing input to an encoder, a video coder, a video decoder, a video codec, a web server, a set-top box, a laptop, a personal computer, a cell phone, a PDA, and any other device for processing an image or a video or other communication devices. As should be clear, the equipment may be mobile and even installed in a mobile vehicle.

Additionally, the methods may be implemented by instructions being performed by a processor, and such instructions (and/or data values produced by an implementation) may be stored on a computer readable storage medium. A computer readable storage medium can take the form of a computer readable program product embodied in one or more computer readable medium(s) and having computer readable program code embodied thereon that is executable by a computer. A computer readable storage medium as used herein is considered a non-transitory storage medium given the inherent capability to store the information therein as well as the inherent capability to provide retrieval of the information therefrom. A computer readable storage medium can be, for example, but is not limited to, an electronic, magnetic, optical, electromagnetic, infrared, or semiconductor system, apparatus, or device, or any suitable combination of the foregoing. It is to be appreciated that the following, while providing more specific examples of computer readable storage mediums to which the present principles can be applied, is merely an illustrative and not exhaustive listing as is readily appreciated by one of ordinary skill in the art: a portable computer diskette; a hard disk; a read-only memory (ROM); an erasable programmable read-only memory (EPROM or Flash memory); a portable compact disc read-only memory (CD-ROM); an optical storage device; a magnetic storage device; or any suitable combination of the foregoing.

The instructions may form an application program tangibly embodied on a processor-readable medium.

Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry as data the rules for writing or reading the syntax of a described example of the present principles, or to carry as data the actual syntax-values written by a described example of the present principles. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application.

The invention claimed is:

1. A method comprising gamut mapping a color from a first color gamut towards a second color gamut, the method of gamut mapping comprising, in a plane of constant hue:
    obtaining a target lightness for a first cusp color that is a color on a boundary of the first gamut with maximum chroma; and
    lightness mapping of the color from the first color gamut towards the second color gamut, wherein the lightness mapped color is calculated from a parabolic function applied to the color, the parabolic function mapping the first cusp color to a color having the target lightness.

2. The method of claim 1, further comprising, in the plane of constant hue, obtaining a preserved chroma; and wherein the lightness mapping of the color from the first color gamut towards the second color gamut further comprises:
    when a chroma of the color is lower than or equal to the preserved chroma, the lightness mapped color is the color, and
    when the chroma of the color is higher than the preserved chroma, the lightness mapped color is calculated from the parabolic function applied to the color.

3. The method of claim 2, wherein the preserved chroma is obtained from a percentage of the chroma of the first cusp color.

4. The method of claim 1, wherein the target lightness corresponds to a lightness of a second cusp color that is a color, on a boundary of the second gamut with maximum chroma.

5. The method of claim 1, wherein the first cusp color is selected from a group of primary colors and of secondary colors.

6. The method of claim 1, wherein the parabolic function comprises a sum of a first term linear with a lightness of the color and of a second term quadratic with a chroma of the color.

7. The method of claim 1, wherein for the color having coordinates $C_{in}$, $L_{in}$ in the plane of constant hue, for the target lightness L', and for the first cusp color having coordinates of $C_{cusp}$, $L_{cusp}$, the mapped lightness $L_{out}$ is given by formula:

$$L_{out} = L_{in} + (L' - L_{cusp}) \cdot \left(\frac{C_{in}}{C_{cusp}}\right)^2.$$

8. A device comprising one or more processors, wherein the one or more processors are configured to perform gamut mapping of a color from a first color gamut towards a second color gamut in a plane of constant hue, the one or more processors being further configured to:
    obtain a target lightness for a first cusp color that is a color on a boundary of the first gamut with maximum chroma; and
    perform a lightness mapping of the color from the first color gamut towards the second color gamut, wherein the lightness mapped color is calculated from a parabolic function applied to the color, the parabolic function mapping the first cusp color to a color having the target lightness.

9. The device of claim 8, wherein the one or more processors are further configured to obtain a preserved chroma; and wherein
    when a chroma of the color is lower than or equal to the preserved chroma, the lightness mapped color is the color, and
    when the chroma of the color is higher than the preserved chroma, the lightness mapped color is calculated from the parabolic function applied to the color.

10. The device of claim 9, wherein the preserved chroma is obtained from a percentage of the chroma of the first cusp color.

11. The device of claim 8, wherein the target lightness corresponds to a lightness of a second cusp color that is a color on a boundary of the second gamut with maximum chroma.

12. The device of claim 8, wherein the first cusp color is selected from a group of primary colors and of secondary colors.

13. The device of claim 8, wherein the parabolic function comprises a sum of a first term linear with a lightness of the color and of a second term quadratic with a chroma of the color.

14. The device of claim 8, wherein for the color having coordinates $C_{in}$, $L_{in}$ in the plane of constant hue, for the target lightness L', and for the first cusp color having coordinates of $C_{cusp}$, $L_{cusp}$, the mapped lightness $L_{out}$ is given by:

$$L_{out} = L_{in} + (L' - L_{cusp}) \cdot \left(\frac{C_{in}}{C_{cusp}}\right)^2.$$

15. A non-transitory processor-readable storage medium having stored instructions that are operative, when executed by a processor, to cause the processor to perform gamut mapping a color from a first color gamut towards a second color gamut, wherein the gamut mapping comprises:
    obtaining a target lightness for a first cusp color that is a color on a boundary of the first gamut with maximum chroma; and lightness mapping of the color from the first color gamut towards the second color gamut, wherein the lightness mapped color is calculated from a parabolic function applied to the color, the parabolic function mapping the first cusp color to a color having the target lightness.

16. The non-transitory processor-readable storage medium of claim 15, further comprising a stored standard dynamic range video and stored metadata relative to parameters used for invertible gamut mapping, wherein the metadata relative to parameters used for gamut mapping comprises a gamut mapping based on a parabolic function.

* * * * *